Patented Mar. 16, 1926.

1,577,075

UNITED STATES PATENT OFFICE.

EARLE C. PITMAN AND GEORGE F. HUNTER, OF PARLIN, NEW JERSEY, ASSIGNORS TO E. I. DU PONT DE NEMOURS & COMPANY, OF WILMINGTON, DELAWARE, A CORPORATION OF DELAWARE.

PROCESS OF REMOVING COLORING MATTER FROM SMOKELESS POWDER.

No Drawing. Application filed November 20, 1922. Serial No. 602,230.

*To all whom it may concern:*

Be it known that we, EARLE C. PITMAN and GEORGE F. HUNTER, citizens of the United States, and residents of Parlin, county of Middlesex, and State of New Jersey, have invented a certain new and useful Process of Removing Coloring Matter from Smokeless Powder, of which the following is a specification.

This invention relates to the removal of coloring matter from smokeless powder, and comprises treating the powder with ethyl alcohol and dilute hydrochloric acid.

The kind of smokeless powder to which this invention is particularly adapted is known either as pyro smokeless powder or pyro powder, and may be defined as that grade of smokeless powder made from nitrocellulose almost completely soluble in a mixture of two parts by volume of ether to one part of ethyl alcohol and having a nitrogen content of about 12.60%. When the World War terminated in the year 1918, there existed large surplus stocks of this "pyro" powder originally containing about 0.5% of diphenylamine. The principal objections to the use of this powder in arts such as liquid coating compositions and cinematographic films, are (1) its relatively high viscosity, making difficult the preparation of solutions of high solid content, and (2) its dark color, due to the presence of diphenylamine introduced as a stabilizer, organic impurities (mainly decomposition products of the nitrocellulose and nitrodiphenylamines), and inorganic salts (chiefly iron derivatives).

The first of said objections has been overcome by the development of efficient methods of reducing the viscosity of nitrocellulose solutions, and the second of the above objections has been overcome in great part by the alcohol extraction process described and claimed in the patent of R. G. Woodbridge, 1,439,656 December 19, 1922, according to which all but faint traces of the diphenylamine can be removed from the powder grains. Although the material obtained by said alcohol extraction process answers the requirements for artificial leather coatings, it is not clear enough for use in such compositions as clear pyroxylin lacquer of high nitrocellulose content, cinematographic film, and transparent or ivory pyralin.

We have now discovered that the objectionable color which is perceptible in the above mentioned articles when they are composed in large part of pyro powder nitrocellulose, can be satisfactorily removed by treating the powder, preferably before solution thereof in the ordinary organic solvents, with a dilute hydrochloric acid solution containing preferably between 0.05% and 15% of hydrogen chloride. An aqueous HCl solution may be used, but an alcoholic HCl solution is preferred. Various other acids capable of transforming the iron derivatives into soluble compounds can be used in place of hydrochloric acid, although hydrochloric acid is believed to be best suited for purposes of this invention.

Our complete process in its preferred form comprises, generally speaking, (1) extraction of the diphenylamine with solvents which dissolve it but do not dissolve the nitrocellulose, (2) treatment of the diphenylamine-free powder with reagents, either acid or alkaline, to render soluble, either in water or organic solvents, the impurities and decomposition products remaining in the powder, and (3) extraction of the powder by substances which are solvents for these decomposition products but are not solvents for the nitrocellulose.

Hot denatured alcohol (that is, ethyl alcohol) is the solvent which we prefer to use for both steps 1 and 3 supra. The extraction constituting step 3 is preferably performed, in part, concurrently with step 2 by using for step 2 hot alcoholic HCl in which the HCl content is from about 0.05% to 15%, and preferably 1%.

The pyro powder to be subject to the above-described treatment should be in such a physical condition as to expose a large surface, the area of this surface being desirably not less than 1,000 square feet per pound of powder. Thus, if the grain size of the powder available is too large, the powder may be ground (preferably under water or alcohol), or otherwise comminuted, to such a fineness that it will all pass through a 40-mesh sieve.

Our invention may be illustrated in greater detail by the following example;—

(1) One part of pyro powder of such fineness as to pass through a 40-mesh sieve is extracted with at least one part, and preferably about two parts, of hot denatured alcohol (i. e. alcohol at a temperature between about 40 and 70° C.), the time required for satisfactory extraction of the diphenylamine being usually more than one hour, and preferably about two hours.

(2) The powder from which diphenylamine has been extracted is then treated with about two parts of hot alcoholic HCl, containing 1% HCl, for at least one hour and preferably for about eight hours.

(3) After draining off the alcoholic HCl used in step (2) above, the powder is subjected to further extractions, with hot denatured alcohol as described in step (1) until the extract is practically free from color, about four extractions, each lasting from one to two hours, being ordinarily required.

Where it is necessary to obtain the lightest colored final product, we have found it desirable to include in this process, between steps (1) and (2), a treatment of the powder with aqueous or alcoholic calcium hypochlorite solution.

In the process as outlined above the viscosity of solutions of the powder is reduced almost 70%, which is a considerably greater viscosity reduction than is brought about by an equally long treatment with alcohol alone.

Oxalic acid is almost as effective as hydrochloric acid in solubilizing the insoluble coloring matter in pyro powder, but sulphuric, nitric, and acetic acids, although having some solubilizing action, are far less effective than hydrochloric or oxalic acid.

We claim:

1. The process of removing from pyro smokeless powder the coloring matter ordinarily present therein, which comprises subjecting said powder to the action of a dilute acid capable of decomposing insoluble coloring matter into soluble products without injuring the nitrocellulose constituent of the powder, and to the extracting action of a solvent for the resulting soluble decomposition products.

2. The process of removing from pyro smokeless powder the coloring matter ordinarily present therein, which comprises extracting said powder with alcohol until most of the diphenylamine present has been removed, subjecting the resulting powder to the action of a dilute acid capable of decomposing insoluble coloring matter into soluble products without injuring the nitrocellulose constituent of the powder, and then subjecting the powder to the extracting action of a solvent for the resulting soluble decomposition products.

3. The process of removing from pyro smokeless powder the coloring matter ordinarily present therein, which comprises extracting said powder with alcohol until most of the diphenylamine present has been removed, subjecting the resulting powder to the action of dilute hydrochloric acid containing between 0.05 and 15% of HCl, and then treating the powder with alcohol to extract therefrom practically all the remaining coloring matter.

4. The process of removing from pyro smokeless powder the coloring matter ordinarily present therein, which comprises treating the powder first with hot alcohol to remove diphenylamine, then with hot alcohol containing from 0.05 to 15% of hydrogen chloride to render soluble the coloring matter remaining in the powder, and then with hot alcohol to remove the solubilized coloring matter.

5. A process as set forth in claim 1 in which the powder is first ground to such an extent that the surface thereof amounts to at least one thousand square feet per pound of powder.

6. A process as set forth in claim 4 in which the powder is first ground to such an extent that the surface thereof amounts to at least one thousand square feet per pound of powder.

7. The process of removing the relatively insoluble coloring matter from pyro smokeless powder which is substantially free from diphenylamine, which comprises treating said powder for at least one hour with hot alcohol containing from .05 to 15% of hydrogen chloride, and then extracting the thus treated powder with hot alcohol until substantially all the alcohol-soluble coloring matter has been removed.

8. A process as set forth in claim 4 in which the hydrogen chloride content of the alcohol is about 1%.

9. A process as set forth in claim 7 in which the hydrogen chloride content of the alcohol is about 1%.

10. A process as set forth in claim 7 in which the powder used is sub-divided so as to pass through a 40-mesh sieve.

In testimony whereof we affix our signatures.

EARLE C. PITMAN.
GEORGE F. HUNTER.